US008863074B2

(12) United States Patent
Trent et al.

(10) Patent No.: US 8,863,074 B2
(45) Date of Patent: Oct. 14, 2014

(54) SOFTWARE MODELING FRAMEWORK

(75) Inventors: Jeffrey Trent, Medford, NJ (US);
Lawrence Feigen, Watchung, NJ (US)

(73) Assignee: Oracle International Corporation, Redwood Shores, CA (US)

(*) Notice: Subject to any disclaimer, the term of this patent is extended or adjusted under 35 U.S.C. 154(b) by 513 days.

(21) Appl. No.: 12/695,082

(22) Filed: Jan. 27, 2010

(65) Prior Publication Data

US 2011/0185340 A1    Jul. 28, 2011

(51) Int. Cl.
*G06F 9/44*    (2006.01)
*G06F 9/445*    (2006.01)

(52) U.S. Cl.
CPC .. *G06F 8/20* (2013.01); *G06F 8/35* (2013.01); *G06F 9/44526* (2013.01)
USPC .......................................................... 717/104

(58) Field of Classification Search
CPC .............. G06F 8/10; G06F 8/20; G06F 8/24; G06F 8/34; G06F 8/35; G06Q 10/10; G06Q 10/06
USPC .......................................................... 717/104
See application file for complete search history.

(56) References Cited

U.S. PATENT DOCUMENTS

2007/0271275 A1* 11/2007 Fassette et al. ................. 707/10
2009/0070786 A1*  3/2009 Alves et al. .................... 719/318
2011/0016477 A1*  1/2011 Schechter et al. ............. 719/330
2011/0078659 A1*  3/2011 Stark et al. .................... 717/122

OTHER PUBLICATIONS

OSGi Alliance, OSGi Service Platform Release 4, Version 4.2—Early Draft 3, Revision 1.2, Mar. 7, 2009, 516 pages.
OSGi Alliance, OSGi Service Platform Release 4, Version 4.2—Early Draft, Revision 1.0, Aug. 5, 2008, 289 pages.
OSGi Alliance, RFC-0112 Bundle Repository, Confidential Draft, Feb. 23, 2006, 38 pages.
OSGi Alliance, RFC 124: Blueprint Service, Draft, Copyright The OSGi Alliance 2009, 165 pages.

* cited by examiner

*Primary Examiner* — Li B Zhen
*Assistant Examiner* — Hui-Wen Lin
(74) *Attorney, Agent, or Firm* — Meyer IP Law Group

(57) ABSTRACT

A system and method for providing a software modeling framework which supports different types of dependency injection and other software modeling or software development frameworks, and which allows software developers to develop models that strategically layer different components for different implementations. A service provider interface (SPI) enables different DI frameworks to be incorporated into the system; while an application provider interface (API) enable machines or implementations to be constructed. Extenders can be modeled so that, for example a particular bundle requires a handler for a particular configuration manifest entry; while a particular module provides handling of that manifest entry.

18 Claims, 5 Drawing Sheets

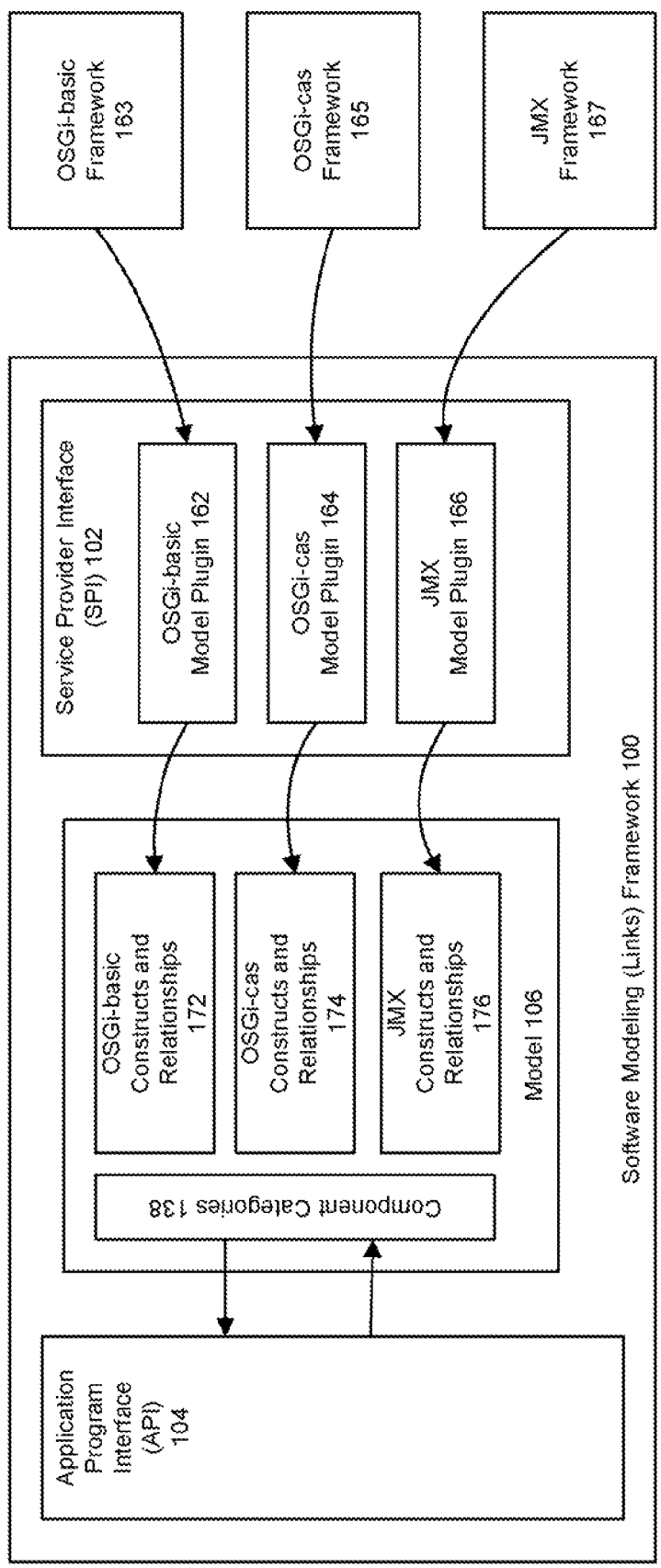

SOFTWARE MODELING FRAMEWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to software modeling and development, and is particularly related to a system and method for providing a generalized software modeling framework which in turn can be extended to support different types of dependency injection and other software modeling or software development frameworks.

BACKGROUND

In software development, dependency injection (DI) generally refers to the process of supplying an external dependency to a software component, such as a software object, using a form of inverse control. Traditionally, if an object needs a particular service, then that object is also responsible for instantiating and ultimately disposing of the service. This tends to increase the object's overall complexity. A DI framework eliminates the need for each object to manage the lifecycle of the services it invokes, and instead allows the object to maintain a reference to an implementation of the service, and then use that implementation to invoke the service's behaviors.

An example of a DI framework that enables dependencies is the OSGi (Open Services Gateway initiative) framework. OSGi defines a module system for the Java software language, and implements a dynamic component model in which applications are modularized into components or bundles. Each bundle is a tightly-coupled, dynamically loadable collection of classes, jars, and configuration files that explicitly declare their external dependencies. A services layer is used to connect bundles in a dynamic manner, by offering a publish-find-bind model for plain old Java objects (Pojo). A services registry API allows for management services, and a lifecycle API allows for lifecycle management of bundles. Applications or components provided as bundles can be remotely installed, started, stopped, updated and uninstalled, without requiring a system reboot.

Other systems provide similar functionality: for example, the OSGi Blueprint Container specification defines a service which uses XML definitions within a bundle to create and wire application objects, and also defines a dependency injection framework for bundles that accounts for the dynamic nature of services. SpringSource similarly defines a DI-like Spring Dynamic Modules (SDM) framework, which enables the use of Spring to configure both the internals of a bundle, and the references between bundles. Additional technologies that make use of, or that are related to DI include the Blueprint Services Specification as described in Request for Comments (RFC) 124, and the OSGi Bundle Repository Specification as described in RFC-112, each of which are herein incorporated by reference.

However, to date, little has been provided in the way of accommodating the variety of different DI and other frameworks in a unified manner that allows for usage and further extension of these frameworks in building new machines and new software applications. This is the general area that embodiments of the invention are intended to address.

SUMMARY

Disclosed herein is a system and method for providing a software modeling framework (generally referred to as the "Links framework", or "Links), which supports different types of dependency injection and other software modeling or software development frameworks, and which allows software developers to develop models that strategically layer different components for different implementations. In accordance with an embodiment, a service provider interface (SPI) enables different DI frameworks to be incorporated into the system; while an application provider interface (API) enable machines or implementations to be constructed. For example, a developer can use the OSGi Blueprint syntax, and harvest Spring Dynamic Modules and/or other open source code, as provided by the SPI; and can use the functions provided by the API to support development of an application server machine, such as a WebLogic Server or other application server implementation. The system also enables support for proprietary features, such as non-OSGi based platforms. Extenders can be modeled so that, for example a particular bundle requires a handler for a particular configuration manifest entry; while a particular module provides handling of that manifest entry. These and other advantages will be evident from the description provided herein.

BRIEF DESCRIPTION OF THE FIGURES

FIG. 2 shows an illustration of how the SPI of the software modeling framework allows for plugin and use of multiple DI frameworks and other models, in accordance with an embodiment.

FIG. 3 shows an illustration of how a relationship between DI or other framework constructs is defined, in accordance with an embodiment.

DETAILED DESCRIPTION

Described herein is a software modeling framework which supports different types of dependency injection and other software modeling or software development frameworks, and allows for modeling the pertinent relationships found in a software system.

In accordance with an embodiment, systems and methods that implement the framework are generally referred to as the "Links framework", or "Links". The system and/or framework provides features such as:

The software model need not be directly aware of specific constructs (e.g., JMX), but is instead based on knowledge of logical types of construct (e.g., Configuration).

Constructs are declarative, and can be added using a service provider interface (SPI).

Relationships between constructs are dynamic, and are also introduced by the SPI.

The model supports both "passive" and "active" usages, wherein passive usage allows relationships to be modeled and recorded; and wherein active usage associates actions with the relationships.

Containment is provided via "requires" parameters, which allows the model to be used to describe a third party component in terms of what a particular component "requires" and/or "produces".

Constructs can optionally support version identifiers.

Figure 1:
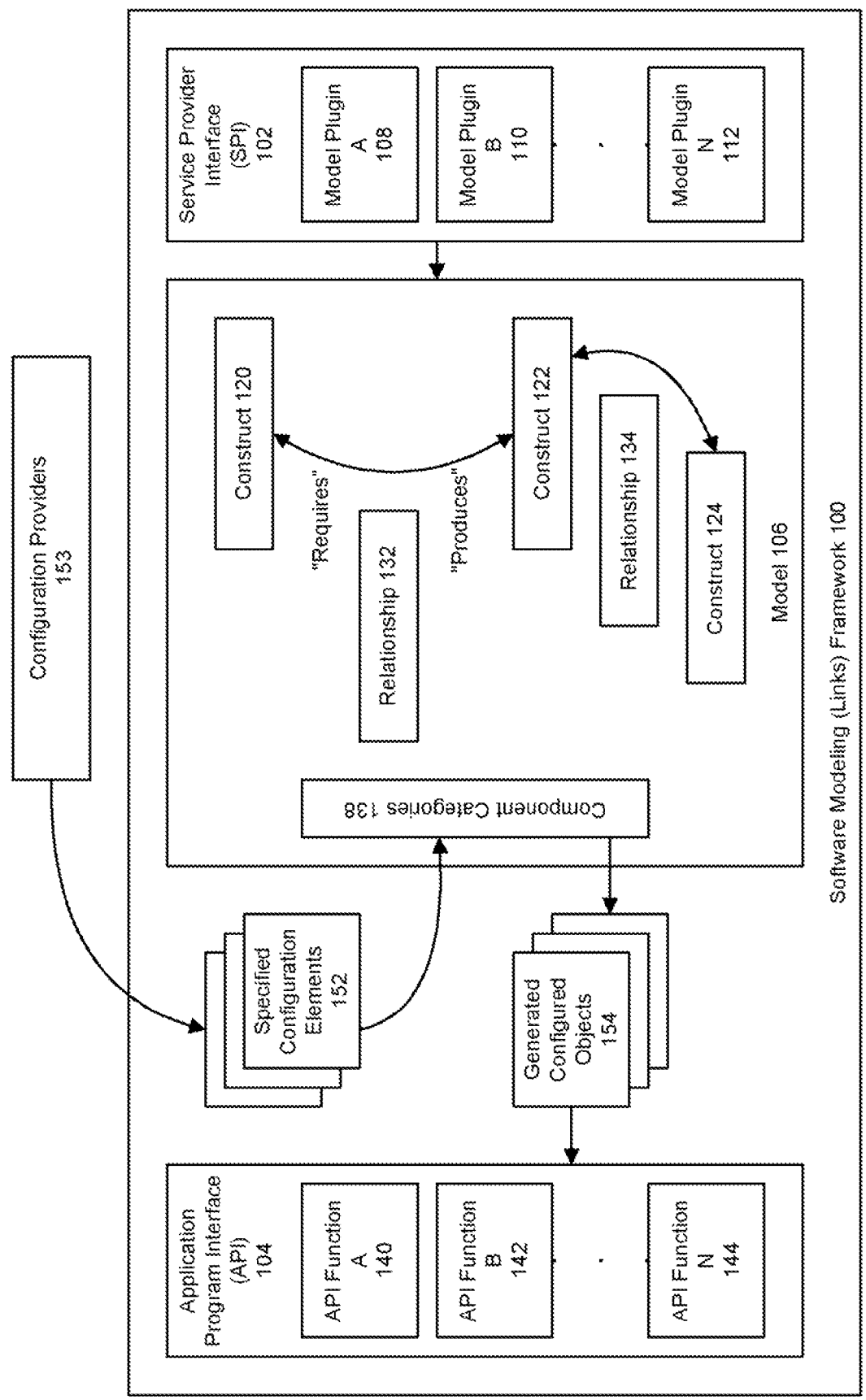
FIG. 1 shows an illustration of a software modeling system or framework in accordance with an embodiment.

FIG. 1 shows an illustration of a software modeling system or framework in accordance with an embodiment. As shown in FIG. 1, the system comprises a service provider interface (SPI) 102, and an application program interface (API) 104. The system further includes a software model 106 which is defined by frameworks, i.e. dependency injection and other software modeling or software development frameworks, which are plugged into the SPI. Generally, the model is generated dynamically at runtime within the memory of the system, and is not stored persistently, although aspects of the model can be recorded or stored for subsequent use.

In accordance with an embodiment, the SPI allows for plugin of one or a plurality of framework model plugins 108, 110, 112. Each plugin contributes to the overall model by introducing constructs 120, 122, 124, and relationships 132, 134 between those constructs, as defined by that particular plugin's corresponding modeling or development framework. For example, an OSGi model plugin can introduce OSGi constructs; while a JMX model plugin can introduce JMX constructs. It will be evident that the preceding examples are provided for purposes of illustration, and that other plugins can be provided corresponding to other modeling or development frameworks.

In accordance with an embodiment, the constructs are declarative, and the relationships between the constructs are dynamic. Each plugin defines the legitimate forms of relationships that are permitted, with respect to the constructs that are being introduced into the system by that particular plugin. The model exposes the constructs as different types or categories of components 138, such as configuration object components. The system then allows the software developer to create machines or implementations by linking objects to those categories.

In accordance with an embodiment, the API provides a plurality of functions 140, 142, 144, which allow for machines or implementations to be specified, generally by the software developer. For example, the API can include functions that allow the software developer to specify configuration elements 152, as provided by configuration providers 153, including that objects be linked to certain categories of component, such as configuration object components, wherein those components have been introduced into the system according to the framework models, constructs and relationships as described above. The API can also be used to instruct the system to output, publish, or otherwise use configured objects 154, which have been generated according to the model.

The Example API Interface section provided below illustrates the types of interfaces, functions, and objects that can be exposed by the API in accordance with a particular non-limiting embodiment. An example is also provided below that illustrates how an embodiment of the API can typically be used to generate a machine. It will be evident that the example interfaces and use cases provided below are provided for purposes of illustration, and that other API interfaces and functions can be included to suit needs of any particular implementation.

FIG. 2 shows an illustration of how the SPI of the software modeling framework allows for plugin and use of multiple DI frameworks and other models, in accordance with an embodiment. As described above, constructs and relationships for each supported modeling or development framework are dynamically introduced into the model and the system via the SPI. For example, this can allow an "OSGi-basic" model plugin 162 to introduce basic OSGi constructs, corresponding to a basic OSGi framework 163, such as Bundle, Package, PojoComponent and Service, and the relationships between those constructs 172. Similarly, an "OSGi-cas" model plugin 164 can introduce compendium constructs, corresponding to a compendium OSGi framework 165, such as CasConfiguration and ManagedService, and the relationships between those constructs 174. Similarly, a JMX model plugin 166 can introduce JMX constructs and relationships 176, corresponding to a JMX framework 167. In accordance with other embodiments other types of software modeling or software development frameworks, corresponding to other frameworks, can be introduced using an appropriate plugin.

FIG. 3 shows an illustration of how, for a particular software modeling or software development framework being introduced via the SPI, the constructs and relationships are defined, in accordance with an embodiment. As shown in FIG. 3, the general form of a relationship 180 can have the form:

[lhs-qualifier] LHS [requires|produces] [rhs-qualifier] RHS [actions]

It will be evident that alternate forms of expressing relationships can be used, in addition to that illustrated above. In the example above, the LHS parameter 182 and RHS parameter 185 identify those constructs which are being introduced into the framework via their respective SPI plugin. For example, in accordance with an embodiment, a construct can be a package, bundle, service, PojoComponent, or another software component.

In accordance with an embodiment, the RHS parameter can also represent a logical aggregate function, namely the OR aggregate function; while an AND function can be represented by providing an additional relationship fact in the system, and duplicating the LHS with a different RHS. The Requires|Produces parameter 183 identifies verbs which are understood by the framework, for example whether a component "requires", or inversely "produces", another component.

The lhs-qualifier parameter 181 and the rhs-qualifier parameter 184 are optional, and are used to constrain the scope of the LHS and RHS constructs respectively. For example, an "active" qualifier can indicate an active component, such as an active bundle. The action parameter is also optional, and represents rules or callbacks that may optionally be fired with the context of the RHS whenever the qualified LHS becomes satisfied and the entire model is collectively defined.

Accordingly, each allowable relationship introduced or governed by the SPI can be interpreted as forming a directed acyclic graph from both a "requires" and "produces" perspective. This generalization allows any type of software modeling or software development framework, or components therein, to be modeled as a plurality of construct and relationships. For example, relationships can even be defined that model the core of the OSGi framework, such as modeling OSGi bundles with respect to imported and exported packages, e.g.

LHS:{Bundle Foo} requires RHS:{Package X};
LHS:{Bundle Foo} produces RHS:{Package Y}).

Figure 4:
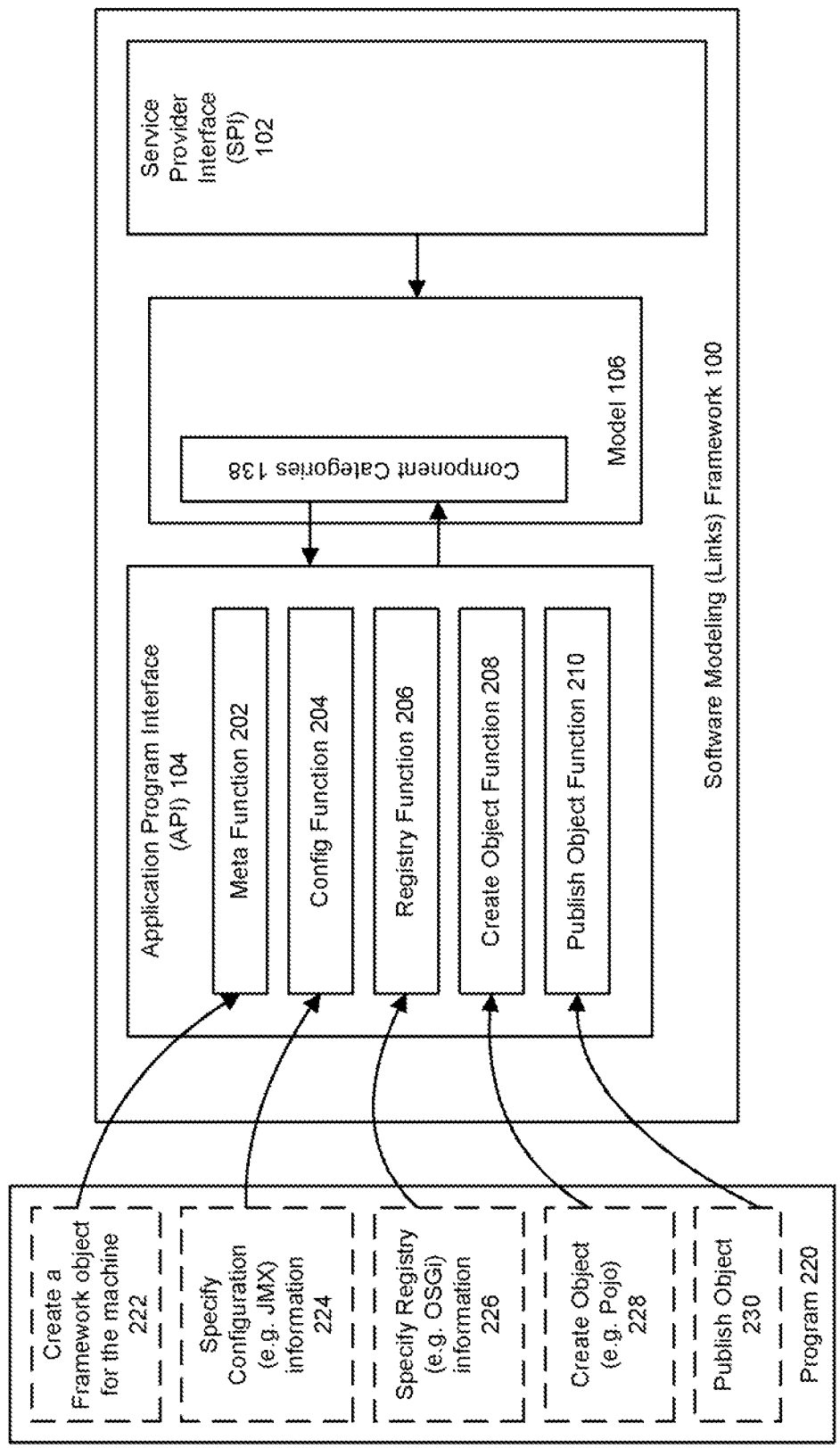
FIG. 4 shows an illustration of how the API of the software modeling framework allows for the creation of machines or implementations, in accordance with an embodiment.

FIG. 4 shows an illustration of how the API of the software modeling framework allows for the creation of machines or implementations, in accordance with an embodiment. As shown in FIG. 4, in accordance with an embodiment the API includes a plurality of functions 220, such as, e.g. a meta function 202, config function 204, registry function 206, create object function 208, and publish object function 210, which collectively allow for the specification and creation of machines, including respectively creating a framework object 222, specifying configuration information 224, specifying a registry 226, creating an implementation object 228, and publishing the object 230. In accordance with other embodiments other types of functions can be provided.

In accordance with an embodiment, the API can be used to find configuration information, as introduced via the SPI according to certain categories of configuration object components. The act of finding configuration information is "producing" an object; while the act of finding service information is "producing" an object; and the act of creating an object produces an object. Thus, the "object creation" operation "consumes" the objects produced by the parts of the system that lookup configuration information and service information. In this manner the system operates by connecting operations together, and the code performing a service lookup does not care from where the lookup key came, but only what it is.

The example provided below illustrates the use of the API in accordance with an embodiment to generate a machine or implementation. In this example, an HTTP server named HOPI has been created, wherein HOPI has a DI file in the DI system PDI; and the PDI file written for HOPI specifies that:

The implementation class for HOPI is com.hopi.Server.
Server has a constructor which takes a single string argument (the "server name") found in the configuration data.
Server has a setter method by the name of setPort( ) which takes a single argument whose value also comes from the configuration data.
Server has a setter method by the name of setThreadingService( ) which takes a single argument, and whose value is provided by looking up a service in the OSGi service registry whose class is com.threadsRUs.Thread and with a second key field named "name" which also comes from configuration data.
The configuration data is provided by looking in JMX, using object names which look like "HOPI:type=server, name=name" (i.e. the object name has a domain of HOPI, a key named "type" with a value of "server" and also has a key named "name").
The JMX MBean has a "name" attribute which is to be used in the constructor above.
The JMX MBean has a "port" attribute which is to be used in the setter above.
The JMX MBean has a "thread-group" attribute which is to be used as the parameter to the service lookup above.

After reading the PDI file, the system instructs the software modeling framework ("Links") to build a machine which satisfies the above criteria. The first step is to get a framework object or links object for creating the machine:
Links links=LinksFactory.createMeta( );
Then, the configuration information is specified, including in this instance specifying a JMX plugin for configuration lookup and the key. The setOneToMany call instructs the software modeling framework that one lookup operation is being set up which will produce many objects, i.e. one for each MBean that meets the lookup criteria:

```
MetaConfig cfg = links.createMetaConfig("JMX");
cfg.setKey("HOPI:type=server");
cfg.setOneToMany( );
```

The software modeling framework is instructed as to what should be obtained in the registry; in this example an OSGi registry. A pair of keys including an objectClass and name, are also specified. It will be noted that the name comes from information produced by the configuration lookup above. For each MBean found above, the software modeling framework creates a registry tracker which will look for a corresponding service in the OSGi service registry:

```
MetaRegistryTracker tracker = links.createMetaRegistryTracker("OSGi");
tracker.addCriterion("objectClass", "com.threadsRUs.Thread");
tracker.addCriterion("name",
cfg.createAttributeProducer("thread-group"));
```

The software modeling framework is then instructed how to create, in this example a plain old Java object (Pojo). Some DI systems create proxies when they create Pojos, but for illustrative purposes it is assumed that in this instance PDI does not. However, PDI must instruct the software modeling framework what class the Pojo uses; the constructor; and then the setters. Since the configuration producers are each coming from a "one-to-many" link, one instance of the Pojo is created for each configured server:

```
MetaPojo pojo = links.createMetaPojo("Proxyless");
pojo.setClassName("com.hopi.Server");
MetaPojoConstructor constructor = pojo.createConstructor( );
constructor.addArgument(cfg.createAttributeProducer("name"));
MetaPojoSetter setter = pojo.createSetter( );
setter.setMethodName("setTTL");
setter.addArgument(cfg.createAttributeProducer("ttl"));
MetaPojoSetter setter2 = pojo.createSetter( );
setter2.addArgument(tracker.createProducer( ));
setter2.setMethodName("setThreadingService( )");
```

Finally, the software modeling framework is instructed to publish the Pojo in the service registry. In this example, the object is published to an OSGi service registry, using the OSGi publisher plugin. Since the configuration producers are each coming from a "one-to-many" link, and since the Pojo is also producing many instances, the Pojo will be published for each configured server:

```
MetaRegistryPublisher publisher =
    links.createMetaRegistryPublisher("OSGi");
publisher.addCriterion("objectClass", "com.hopi.Server");
publisher.addCriterion("name", cfg.createAttributeProducer("name"));
publisher.setObject(pojo.createProducer( ));
```

It will be evident that the above illustration described just one example of how the software modeling framework can be instructed to create a machine or implementation with particular parameters. In accordance with other embodiments other types of configurations can be provided.

Figure 5:
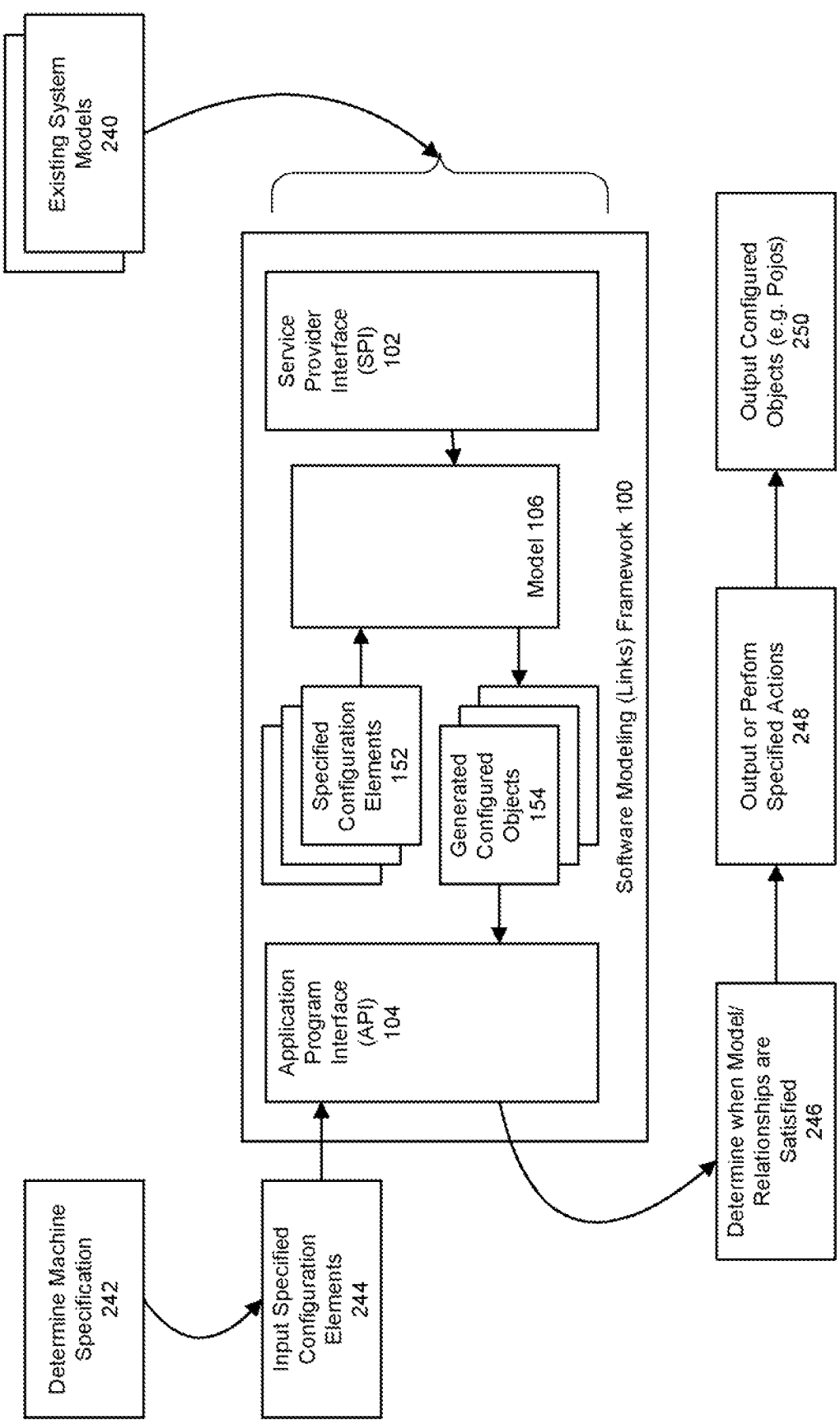
FIG. 5 shows an illustration of how a software modeling framework can be used in an active mode to construct a machine, in accordance with an embodiment.

FIG. 5 shows an illustration of how a software modeling framework can be used in an active mode to construct a machine, in accordance with an embodiment. As shown in FIG. 5, in accordance with an embodiment, existing system models 240 can be used as described above, to introduce a plurality of constructs and relationships via the SPI plugins, which are then governed by the SPI. Machines or implementations can also be specified 242 by the software developer using the functions of the API, such as by providing an input file with specified configuration elements 244. In accordance with the active mode, a determination is made 246 as to whether a qualified relationship becomes satisfied and/or the entire model is collectively defined, at which point optional action parameters represent rules or callbacks that may be optionally fired 248. In accordance with an embodiment, these actions can include outputting configured objects, such as Pojos, which satisfy the developer-specified configuration elements, as determined by the model and constructs and relationships defined therein.

Figure 6:
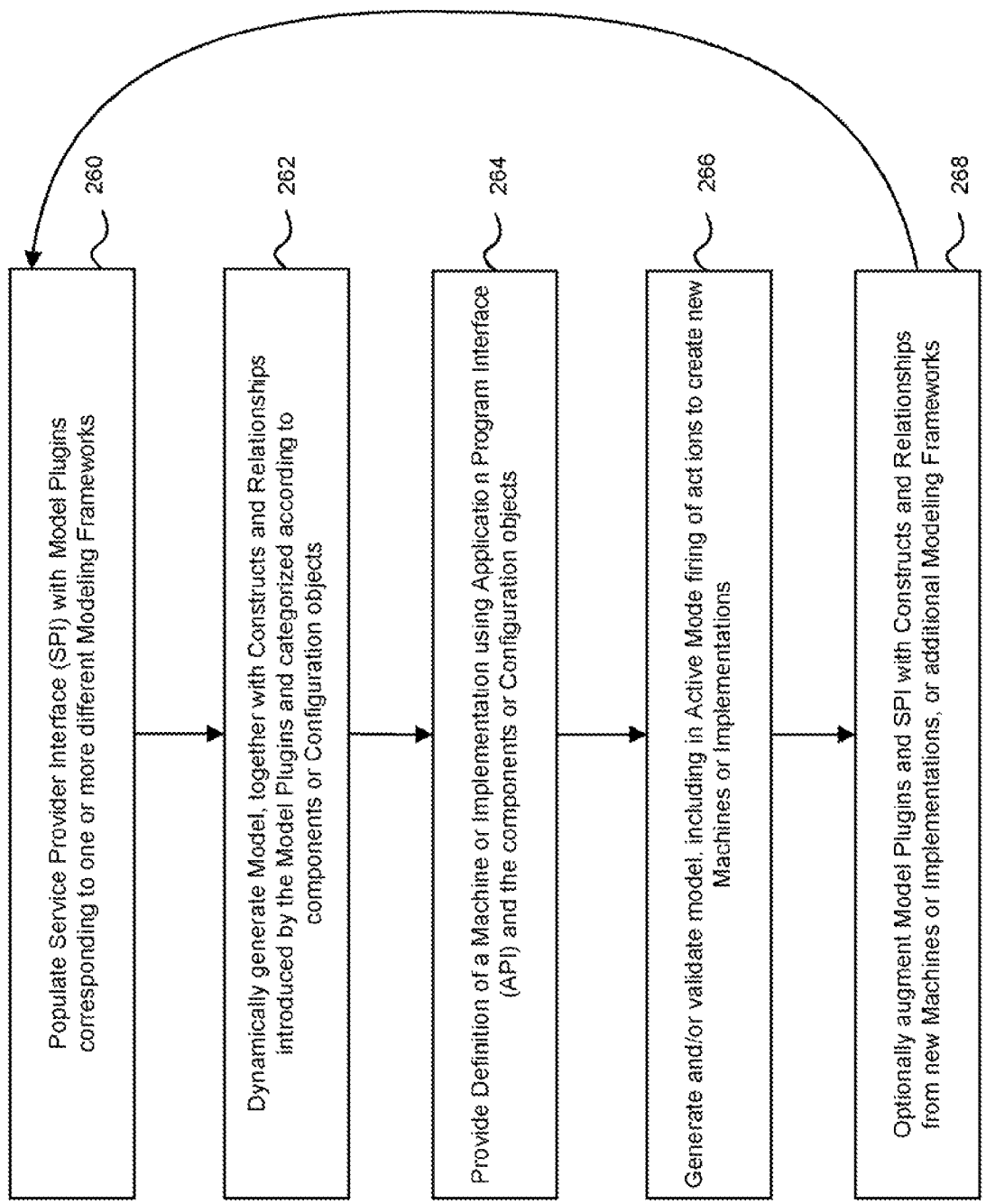
FIG. 6 is a flowchart of a process for creating and using a software modeling framework, in accordance with an embodiment.

FIG. 6 is a flowchart of a process for creating and using a software modeling framework, in accordance with an embodiment. As shown in FIG. 6, in step 260, the service provider interface (SPI) is populated with model plugins corresponding to one or more different modeling frameworks. In step 262, the system dynamically generates a model, together with the constructs and relationships introduced by the model plugins and categorized according to different components or configuration objects. In step 264, a definition of a machine or implementation is provided, generally by a software developer, using the application program interface (API) and indicating the required components or configuration objects. In the step 266, the system generates and/or validates the model to match the required components or configuration objects, including if in active mode the firing of actions to create new machines or implementations. In step 268, the model can be optionally augmented with additional plugins via the SPI, and/or with constructs and relationships from new machines or implementations, or additional modeling frameworks.

Example API Interface

The following section provides an overview of API functions, including interfaces and classes in accordance with one particular, non-limiting embodiment. It will be evident that the API interface and classes provided herein are provided for purposes of illustration, and that other interface and classes can be included to suit needs of any particular implementation. In particular, in accordance with other embodiments, the API may not be limited to providing the particular interfaces and classes described hereunder. Modifications and variations, including the providing of different APIs, with similar functionality but different interfaces and classes, will be apparent to the practitioner skilled in the art.

```
Interface ConcreteLink
public interface ConcreteLink
available
void available(Object object)
provisionallyAvailable
void provisionallyAvailable(Object object)
throws ValueRejectedException
Throws:
ValueRejectedException
noLongerAvailable
void noLongerAvailable( )
provisionallyNoLongerAvailable
void provisionallyNoLongerAvailable( )
throws ValueRejectedException
Throws:
ValueRejectedException
changed
void changed(Object object)
provisionallyChanged
void provisionallyChanged(Object object)
throws ValueRejectedException
Throws:
ValueRejectedException
rollback
void rollback( )
registerListener
void registerListener(Listener listener)
Interface ConcreteLinkListener
public interface ConcreteLinkListener
available
void available(Object object)
Interface Links
public interface Links
```

In accordance with an embodiment, the Interface Links object is used for both the API and SPI sides of the software modeling framework. On the API side, operations are about creating things that need to be "linked". For example, a Pojo may not be able to be created until configuration data is available. Further, it may also require fetching an object from the OSGi service registry. In this example, one creates a Meta configuration, a Meta "lookup", a Meta "POJO" and link the third to the first two. The SPI side handles links's ability to plugin different types of each of these things. For example, there may be 10 different configuration systems supported; each is a plugin of type "configuration".

```
createMetaConfig
MetaConfig createMetaConfig(String configType)
Create a single configuration "meta-object" using the plugin of the named type. Information about the
nature of the configuration object (e.g. what is the key for looking it up) is supplied via operations on the
returned object.
Parameters:
configType - the type of configuration system
Returns:
a configuration meta-object
createMetaPojo
MetaPojo createMetaPojo(String pojoType)
Create a single pojo "meta-object" using the plugin of the named type. Information about the nature of the
pojo (e.g. what arguments to pass to the constructor) is supplied by operations on the returned meta-object.
Parameters:
pojoType - the type of pojo constructor
Returns:
a pojo meta-object
createMetaRegistryPublisher
MetaRegistryPublisher createMetaRegistryPublisher(String publishType)
Create a single publish "meta-object" using the plugin of the named type. Information about how to pub-
lish
the data (e.g. what is the key) is supplied by operations on the returned object.
```

Parameters:
publishType - the type of publisher (e.g. OSGi service registry)
Returns:
a meta-object for publish operations
createMetaRegistryTracker
MetaRegistryTracker createMetaRegistryTracker(String lookupType)
Create a single lookup "meta-object" using the plugin of the named type. Information about how to look up the data (e.g. what is the key) is supplied by operations on the returned object.
Parameters:
lookupType - the type of system on which to perform the lookup (e.g. OSGi service registry)
Returns:
a meta-object for lookup operations
registerProviderConfig
void registerProviderConfig(String providerName,
ProviderConfig provider)
Register a configuration plugin - a plugin that knows how to find data in a configuration system
Parameters:
providerName - the configuration system being accessed
provider - the plugin
registerProviderPojo
void registerProviderPojo(String providerName,
ProviderPojo provider)
Register a POJO plugin - a plugin that knows how to construct java objects.
Parameters:
providerName - the name of an object construction system
provider - the plugin
registerProviderRegistryTracker
void registerProviderRegistryTracker(String providerName,
ProviderRegistryTracker provider)
Register a lookup plugin - a plugin that knows how to look up objects in a registry/database.
Parameters:
providerName - the registry/database being accessed
provider - the plugin
registerProviderRegistryPublisher
void registerProviderRegistryPublisher(String providerName,
ProviderRegistryPublisher provider)
Register a publish plugin - a plugin that knows how to put objects into a registry/database.
Parameters:
providerName - the registry/database being used
provider - the plugin
setInProgress
void setInProgress(boolean inProgress)
Before creating links machinery, set the system as in progress; when done, set it to false.
Interface Listener
public interface Listener
available
void available(Object object)
provisionallyAvailable
void provisionallyAvailable(Object object)
throws ValueRejectedException
Throws:
ValueRejectedException
noLongerAvailable
void noLongerAvailable( )
provisionallyNoLongerAvailable
void provisionallyNoLongerAvailable( )
throws ValueRejectedException
Throws:
ValueRejectedException
changed
void changed(Object object)
provisionallyChanged
void provisionallyChanged(Object object)
throws ValueRejectedException
Throws:
ValueRejectedException
rollback
void rollback( )
Interface Meta
public interface Meta
makeConcrete
com.oracle.lifecycle.links.internal.Concrete makeConcrete( )
makeConcrete
com.oracle.lifecycle.links.internal.Concrete
makeConcrete(Map<Meta,com.oracle.lifecycle.links.internal.Concrete> dictionary
)
makeFanoutLink
ConcreteLink makeFanoutLink(MetaProducer producer)
findFanoutLink

```
ConcreteLink findFanoutLink(MetaProducer producer)
setClassLoader
void setClassLoader(ClassLoader cl)
getClassLoader
ClassLoader getClassLoader( )
getAllOutboundProducers
Collection<MetaProducer> getAllOutboundProducers( )
getSimpleOutboundProducers
Collection<MetaProducer> getSimpleOutboundProducers( )
getAttributedOutboundProducers
Collection<AttributeProducerPair> getAttributedOutboundProducers( )
getOptional
Map<String,MetaProducer> getOptional( )
getNeeded
Map<String,MetaProducer> getNeeded( )
setOneToMany
void setOneToMany( )
setOneToOneInstanced
void setOneToOneInstanced( )
isInstanced
boolean isInstanced( )
isOneToMany
boolean isOneToMany( )
isOneToOneInstanced
boolean isOneToOneInstanced( )
isOneToOneSingleton
boolean isOneToOneSingleton( )
Interface MetaCodeUnit
public interface MetaCodeUnit
extends Meta
setListenAttribute
void setListenAttribute(MetaProducer attribute)
setListenAttribute
void setListenAttribute(Object attribute)
createClassLoaderProducer
MetaProducer createClassLoaderProducer( )
getClassLoaderProducers
Collection<MetaProducer> getClassLoaderProducers( )
createAttributeProducer
MetaProducer createAttributeProducer(String type,
String attribute)
getAttributeProducers
Collection<AttributeProducerPair> getAttributeProducers( )
Interface MetaConfig
public interface MetaConfig
extends Meta
```

In accordance with an embodiment, the Interface MetaConfig object is provided as an "API side" interface for the software modeling framework. Using this interface, a higher-level module sets up links machinery to handle tracking configuration information. In order to "listen" to a configuration system, one must state the key to the configuration information. The format of the key is dependent on the type of configuration system (most take a String). One must also state how one wants the data: one can ask for the whole configuration object or just a particular attribute. One may create as many producers as one wants.

```
setKey
void setKey(Object key)
    Give the lookup key for configuration tracking.
    Parameters:
        object - the lookup key
setKey
void setKey(MetaProducer producer)
    Give the lookup key for configuration tracking.
    Parameters:
        producer - produces a lookup key
createWholeObjectProducer
MetaProducer createWholeObjectProducer( )
    Create a producer which gives the whole configuration object
        found using key.
```

```
    Returns:
        a producer for the object
createAttributeProducer
MetaProducer createAttributeProducer(String attribute)
    Create a producer which gives an object which represents the value of
        a particular attribute of a found configuration object.
    Parameters:
        attribute - the name of the attribute (the format of this string
        may depend on the type of configuration system)
    Returns:
        a producer for the attribute
Interface MetaConfigSystem
public interface MetaConfigSystem
    create
MetaConfig create(String configType)
Interface MetaPojo
public interface MetaPojo
extends Meta
```

In accordance with an embodiment, the Interface MetaPojo object is an "API side" interface for the software modeling framework. Using this interface, a higher-level module sets up links machinery to create a POJO. One must provide the name of the class to be created as well as defining constructors and setters.

```
    setClassName
    void setClassName(String className)
```

Set the name of the class to be constructed
Parameters: className—the name
setClassName
void setClassName(MetaProducer classNameProducer)
Set the name of the class to be constructed using a producer, so that the class name can be derived through some other operation.
Parameters: classNameProducer—a producer
createConstructor
MetaPojoConstructor createConstructor( )
Create a constructor object (with which to describe the constructor)
Returns: a new constructor object
getConstructors
Collection<MetaPojoConstructor>getConstructors( )
Get the list of constructors (useful for SPI side)
Returns: list of constructors
createSetter
MetaPojoSetter createSetter( )
Create a setter object (with which to describe a setter)
Returns: a new setter object
getSetters
Collection<MetaPojoSetter>getSetters( )
Get the list of setters (useful for SPI side)
Returns: list of setters
createProducer
MetaProducer createProducer( )
Create a producer to get the POJO after it is constructed.
Returns: a POJO producer
getProducers
Collection<MetaProducer>getProducers( )
Get list of producers for this POJO
Returns: producers for this POJO
createAttributeProducer
MetaProducer createAttributeProducer(String type, tring attribute)
Create a producer which produces the value of an attribute in a constructed POJO.
Parameters: type—depends on POJO plugin, "type 1" POJO supports "method" and "field"
attribute—attribute to get
Returns: a producer
getAttributeProducers
Collection<AttributeProducerPair>getAttributeProducers( )
Get the list of attribute producers (mainly for SPI side).
Returns: list of producers
addCriterion
void addCriterion(String key, MetaProducer producer)
Used internally
Interface MetaPojoConstructor (public interface MetaPojoConstructor)
addArgument
void addArgument(MetaProducer producer)
getNumberOfArguments
int getNumberOfArguments( )
getArgument
Object getArgument(Map<String,Object>args, nt argno)
done
void done( )
Interface MetaPojoSetter (public interface MetaPojoSetter)
addArgument
void addArgument(MetaProducer producer)
addArgument
void addArgument(Object object)
setMethodName
void setMethodName(String methodName)
getMethodName
String getMethodName( )
Interface MetaProducer (public interface MetaProducer)
getObject
Object getObject( )
makeConcrete
ConcreteLink
makeConcrete(Map<Meta,com.oracle.lifecycle.links.internal.Concrete>dictionary)
makeConcreteRecursively
ConcreteLink
makeConcreteRecursively(Map<Meta,com.oracle.lifecycle.links.internal.Concrete>dictionary)
setOutboundMeta
void setOutboundMeta(Meta outboundMeta)
getOutboundMeta
Meta getOutboundMeta( )
setInboundMeta
void setInboundMeta(Meta inboundMeta)
getInboundMeta
Meta getInboundMeta( )
Interface MetaRegistryPublisher (public interface MetaRegistryPublisher extends Meta)
addCriterion
void addCriterion(String criterion, MetaProducer producer)
addCriterion
void addCriterion(String criterion, Object object)
setObject
void setObject(MetaProducer producer)
Interface MetaRegistryTracker (public interface MetaRegistryTracker extends Meta)
addCriterion
void addCriterion(String criterion, MetaProducer producer)
addCriterion
void addCriterion(String criterion, Object object)
createProducer
MetaProducer createProducer( )
Interface ProviderConfig (public interface ProviderConfig) create
MetaConfig create( )
Interface ProviderPojo (public interface ProviderPojo) create
MetaPojo create( )
Interface ProviderRegistryPublisher (public interface ProviderRegistryPublisher)
create
MetaRegistryPublisher create( )
Interface ProviderRegistryTracker (public interface ProviderRegistryTracker) create
MetaRegistryTracker create( )
Class AttributeLinkPair
public class AttributeLinkPair
extends Object
AttributeLinkPair
public AttributeLinkPair(String string, ConcreteLink link)+
getString
public String getString( )
getLink
public ConcreteLink getLink( )
toString
public String toString( )
Overrides: toString in class Object Class AttributeListenerPair
public class AttributeListenerPair
extends Object
AttributeListenerPair
public AttributeListenerPair(String string, oncreteLinkListener listener)
getString
public String getString( )
getListener
public ConcreteLinkListener getListener( )
toString
public String toString( )
Overrides: toString in class Object
Class AttributeProducerPair
public class AttributeProducerPair
extends Object
AttributeProducerPair
public AttributeProducerPair(MetaProducer producer, String string)
getString
public String getString( )
getProducer
public MetaProducer getProducer( )
toString
public String toString( )
Overrides: toString in class Object
Class Bundle
public class Bundle
extends com.oracle.lifecycle.links.internal.MetaImpl
implements MetaCodeUnit
Bundle
public Bundle( )
setListenAttribute
public void setListenAttribute (MetaProducer attribute)
Specified by: setListenAttribute in interface MetaCodeUnit
setListenAttribute
public void setListenAttribute(Object attribute)
Specified by: setListenAttribute in interface MetaCodeUnit
createClassLoaderProducer
public MetaProducer createClassLoaderProducer( )
Specified by: createClassLoaderProducer in interface MetaCodeUnit
getClassLoaderProducers
public Collection<MetaProducer>getClassLoaderProducers( )
Specified by: getClassLoaderProducers in interface MetaCodeUnit
createAttributeProducer
public MetaProducer createAttributeProducer(String type, String attribute)
Specified by: createAttributeProducer in interface MetaCodeUnit
getAttributeProducers
public Collection<AttributeProducerPair>getAttributeProducers ( )
Specified by: getAttributeProducers in interface MetaCodeUnit
newInstance
public ConcreteLinkListener newInstance( )
makeConcrete
public com.oracle.lifecycle.links.internal.Concrete makeConcrete( )
Specified by: makeConcrete in interface Meta
Specified by: makeConcrete in class
com.oracle.lifecycle.links.internal.MetaImpl
Class BundleConcrete
public class BundleConcrete
extends com.oracle.lifecycle.links.internal.ConcreteImpl
prepareReady
public void prepareReady(Map values) throws ValueRejectedException
Specified by: prepareReady in class com.oracle.lifecycle.links.internal.ConcreteImpl
ready
public void ready(Map<String,Object>values)
Specified by: ready in class com.oracle.lifecycle.links.internal.ConcreteImpl
rollback
public void rollback( )
Specified by: rollback in class com.oracle.lifecycle.links.internal.ConcreteImpl
prepareNotReady
public void prepareNotReady(Map<String, Object>values)
Specified by: prepareNotReady in class com.oracle.lifecycle.links.internal.ConcreteImpl
notReady
public void notReady(Map<String, Object>values)
Specified by: notReady in class com.oracle.lifecycle.links.internal.ConcreteImpl
Class BundleConcreteInstance
public class BundleConcreteInstance
extends Object
Class CM
public class CM
extends com.oracle.lifecycle.links.internal.MetaImpl
implements MetaConfig
CM
public CM( )
setKey
public void setKey(Object value)
Description copied from interface: Metaconfig
Give the lookup key for configuration tracking.
Specified by: setKey in interface MetaConfig
setKey
public void setKey(MetaProducer producer)
Description copied from interface: MetaConfig
Give the lookup key for configuration tracking.
Specified by: setKey in interface MetaConfig
Parameters: producer—produces a lookup key
createWholeObjectProducer
public MetaProducer createWholeObjectProducer( )
Description copied from interface: MetaConfig
Create a producer which gives the whole configuration object found using key.
Specified by: createWholeObjectProducer in interface MetaConfig
Returns: a producer for the object
createAttributeProducer
public MetaProducer createAttributeProducer(String attribute)
Description copied from interface: MetaConfig
Create a producer which gives an object which represents the value of a particular attribute of a found configuration object.
Specified by: createAttributeProducer in interface MetaConfig
Parameters: attribute—the name of the attribute (the format of this string may depend on the type of configuration system)
Returns: a producer for the attribute makeConcrete
public com.oracle.lifecycle.links.internal.Concrete makeConcrete( )
Specified by: makeConcrete in interface Meta
Specified by: makeConcrete in class com.oracle.lifecycle.links.internal.MetaImpl
Class CMConcrete
public class CMConcrete
extends com.oracle.lifecycle.links.internal.ConcreteImpl
implements com.bea.core.configuration.manager.ConfiguredTypeListener
ready
public void ready(Map<String,Object>values)
Specified by: ready in class com.oracle.lifecycle.links.internal.ConcreteImpl
rollback
public void rollback( )
Specified by: rollback in class com.oracle.lifecycle.links.internal.ConcreteImpl
prepareNotReady
public void prepareNotReady(Map<String, Object>values)
Specified by: prepareNotReady in class com.oracle.lifecycle.links.internal.ConcreteImpl
notReady
public void notReady(Map<String,Object>values)
Specified by: notReady in class com.oracle.lifecycle.links.internal.ConcreteImpl
prepareReady
public void prepareReady(Map<String,Object>values)
Specified by: prepareReady in class com.oracle.lifecycle.links.internal.ConcreteImpl
registration Confirmed
public void registrationConfirmed(String type, Object instanceKey, com.bea.core.configuration.manager.ConfigurationDatabase db)
Specified by: registrationConfirmed in interface com.bea.core.configuration.manager.ConfiguredTypeListener
validate
public void
validate (com.bea.core.configuration.manager.ConfigurationDatabase db, List<com.bea.core.configuration.manager.ConfigurationAction>actions)
Specified by: validate in interface com.bea.core.configuration.manager.ConfiguredTypeListener
prepare
public void
prepare(com.bea.core.configuration.manager.ConfigurationDatabase db, List<com.bea.core.configuration.manager.ConfigurationAction>actions) throws com.bea.core.configuration.manager.Prepare Failure Exception
Specified by: prepare in interface com.bea.core.configuration.manager.ConfiguredTypeListener
activate
public void
activate(com.bea.core.configuration.manager.ConfigurationDatabase db, List<com.bea.core.configuration.manager.ConfigurationAction>actions)
Specified by: activate in interface com.bea.core.configuration.manager.ConfiguredTypeListener
rollback
public void
rollback(com.bea.core.configuration.manager. ConfigurationDatabase db, List<com.bea.core.configuration.manager.ConfigurationAction>actions)
Specified by: rollback in interface com.bea.core.configuration.manager.ConfiguredTypeListener
Class CMConcreteInstance
public class CMConcreteInstance
extends com.oracle.lifecycle.links.internal.ConcreteInstanceImpl
implements com.bea.core.configuration.manager.ConfiguredTypeListener
registration Confirmed
public void registrationConfirmed(String type, Object instanceKey, com.bea.core.configuration.manager.ConfigurationDatabase db)
Specified by: registrationConfirmed in interface com.bea.core.configuration.manager. ConfiguredTypeListener
validate
public void
validate(com.bea.core.configuration.manager. ConfigurationDatabase db, List<com.bea.core.configuration.manager.ConfigurationAction>actions)
Specified by: validate in interface com.bea.core.configuration.manager.ConfiguredType Listener
prepare
public void
prepare(com.bea.core.cOnfiguration.manager. ConfigurationDatabase db, List<com.bea.core.configuration.manager.ConfigurationAction>actions) throws com.bea.core.configuration.manager.PrepareFailureException
Specified by:
prepare in interface com.bea.core.configuration.manager.ConfiguredTypeListener
activate
public void
activate(com.bea.core.configuration.manager.ConfigurationDatabase db, List<com.bea.core.configuration.manager.ConfigurationAction>actions)
Specified by: activate in interface com.bea.core.configuration.manager.ConfiguredTypeListener
die
public void die( )
Specified by: die in interface com.oracle.lifecycle.links.internal.ConcreteInstance
Overrides: die in class com.oracle.lifecycle.links.internal.ConcreteInstanceImpl
rollback
public void
rollback(com.bea.core.configuration.manager.ConfigurationDatabase db, List<com.bea.core.configuration.manager.ConfigurationAction>actions)
Specified by: rollback in interface com.bea.core.configuration.manager.ConfiguredTypeListener
Class CMFactory
public class CMFactory
extends Object
implements ProviderConfig
CMFactory
public CMFactory( )
create public MetaConfig create( )
Specified by: create in interface ProviderConfig
Class CMSingleton
public class CMSingleton
extends Object
CMSingleton
public CMSingleton( )
setCMListeningService
public void setCMListeningService(com.bea.core.configuration.manager.ConfigurationM anagerListeningService svc)
Class DualRegistryPublisherFactory
public class DualRegistryPublisherFactory
extends Object
implements ProviderRegistryPublisher
DualRegistryPublisherFactory
public DualRegistryPublisherFactory( )
create
public MetaRegistryPublisher create( )
Specified by: create in interface ProviderRegistryPublisher
Class DualRegistryTrackerFactory
public class DualRegistryTrackerFactory
extends Object
implements ProviderRegistryTrackercreate
public MetaRegistryTracker create( )
Specified by: create in interface ProviderRegistryTracker
Class ImmediateProducer
public class ImmediateProducer
extends com.oracle.lifecycle.links.internal.MetaProducerImpl
ImmediateProducer
public ImmediateProducer(Object object)
Class LinksException
public class LinksException
extends Exception
The base class for all Links exceptions.
LinksException
public LinksException( )
LinksException
public LinksException(String message)
Parameters: message—
LinksException
public LinksException(String message, Throwable cause)
Parameters: message—
cause—
LinksException
public LinksException(Throwable cause)
Parameters: cause—
Class LinksFactory
public class LinksFactory
extends Object
LinksFactory
public LinksFactory( )
createMeta
public static Links createMeta(ClassLoader cl)
Create a links instance with which to speak to links
Returns: a Links instance
createMeta
public static Links createMeta( )
Class Type1
public class Type1
extends com.oracle.lifecycle.links.internal.MetaImpl
implements MetaPojo
Type1
public Type1( )
newInstance
public void newInstance( )

setClassName
public void setClassName(String className)
Description copied from interface: MetaPojo
Set the name of the class to be constructed
Specified by: setClassName in interface MetaPojo
Parameters: className—the name
setClassName
public void setClassName(MetaProducer classNameProducer)
Description copied from interface: MetaPojo
Set the name of the class to be constructed using a producer, so that the class name can be derived through some other operation.
Specified by: setClassName in interface MetaPojo
Parameters: classNameProducer—a producer
createConstructor
public MetaPojoConstructor createConstructor( )
Description copied from interface: MetaPojo
Create a constructor object (with which to describe the constructor)
Specified by: createConstructor in interface MetaPojo
Returns: a new constructor object
getConstructors
public Collection<MetaPojoConstructor>getConstructors( )
Description copied from interface: MetaPojo
Get the list of constructors (useful for SPI side)
Specified by: getConstructors in interface MetaPojo
Returns: list of constructors
createSetter
public MetaPojoSetter createSetter( )
Description copied from interface: MetaPojo
Create a setter object (with which to describe a setter)
Specified by: create Setter in interface MetaPojo
Returns: a new setter object
getSetters
public Collection<MetaPojoSetter>getSetters( )
Description copied from interface: MetaPojo
Get the list of setters (useful for SPI side)
Specified by: getSetters in interface MetaPojo
Returns: list of setters
createProducer
public MetaProducer createProducer( )
Description copied from interface: MetaPojo
Create a producer to get the POJO after it is constructed.
Specified by: createProducer in interface MetaPojo
Returns: a POJO producer
getProducers
public Collection<MetaProducer>getProducers( )
Description copied from interface: MetaPojo
Get list of producers for this POJO
Specified by: getProducers in interface MetaPojo
Returns: producers for this POJO
createAttributeProducer
public MetaProducer createAttributeProducer(String type, String attribute)
Description copied from interface: MetaPojo
Create a producer which produces the value of an attribute in a constructed POJO.
Specified by: createAttributeProducer in interface MetaPojo
Parameters: type—depends on POJO plugin, "type 1" POJO supports "method" and "field"
attribute—attribute to get
Returns: a producer
getAttributeProducers

```
public    Collection<AttributeProducerPair>getAttribute
    Producers( )
Description copied from interface: MetaPojo
Get the list of attribute producers (mainly for SPI side).
Specified by: getAttributeProducers in interface MetaPojo
Returns: list of producers
makeConcrete
public          com.oracle.lifecycle.links.internal.Concrete
    makeConcrete( )
Specified by: makeConcrete in interface Meta
Specified by: makeConcrete in class
com.oracle.lifecycle.links.internal.MetaImpl
addCriterion
public void addCriterion(String key, MetaProducer pro-
    ducer)
Description copied from interface: MetaPojo
Used internally
Specified by: addCriterion in interface MetaPojo
Class Type1Concrete
public class Type1Concrete
extends com.oracle.lifecycle.links.internal.ConcreteImpl
ready
public void ready(Map<String,Object>values)
Specified by: ready in class com.oracle.lifecycle.links.in-
    ternal.ConcreteImpl
rollback
public void rollback( )
Specified by: rollback in class
com.oracle.lifecycle.links.internal.ConcreteImpl
prepareNotReady
public          void          prepareNotReady(Map<String,
    Object>values) throws
ValueRejectedException
Specified by: prepareNotReady in class
com.oracle.lifecycle.links.internal.ConcreteImpl
notReady
public void notReady(Map<String,Object>values)
Specified by: notReady in class
com.oracle.lifecycle.links.internal.ConcreteImpl
prepareReady
public void prepareReady(Map<String,Object>values)
    throws
ValueRejectedException
Specified by: prepareReady in class
com.oracle.lifecycle.links.internal.ConcreteImpl
Class Type1Factory
public class Type1Factory
extends Object
implements ProviderPojo
Type1Factory
public Type1Factory( )
create
public MetaPojo create( )
Specified by: create in interface ProviderPojo
Class ValueRejectedException
public class ValueRejectedException
extends LinksException
ValueRejectedException
public ValueRejectedException( )
```

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. In particular, although several of the embodiments described above illustrate the use of the software modeling framework within the context of the OSGi framework, it will be evident that other frameworks and DI frameworks can be used, in addition to or instead of OSGi. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system that supports the use of different types of dependency injection and other software modeling or software development frameworks, comprising:
    a computer, including a processor and memory;
    a service provider interface (SPI) which allows for plugin of a plurality of framework model plugins, including at least a first framework model plugin for an Open Services Gateway initiative (OSGi) framework having a first modeling or development framework and a second framework model plugin for a Java Management Extensions (JMX) framework having a second modeling or development framework different than the first modeling and development framework model,
        wherein the first framework model plugin introduces, into a unified software model, a first plurality of constructs and a first plurality of legitimate relationships between the first plurality of constructs, including whether a particular construct requires or produces another construct, as defined by the first modeling or development framework, and wherein the first plurality of constructs introduced by the first framework model plugin can be exposed as categories of component for use with the unified software model, and
        wherein the second framework model plugin introduces, into the unified software model, a second plurality of constructs and a second plurality of legitimate relationships between the second plurality of constructs, including whether a particular construct requires or produces another construct, as defined by the second modeling or development framework, and wherein the second plurality of constructs introduced by the second framework model plugin can be exposed as categories of component for use with the unified software model;

an application provider interface (API) which exposes the categories of component provided by the unified software model and which provides a plurality of functions that allow for machines or implementations to be specified by a software developer, including that objects be linked to the categories of component that are defined by the SPI and the plurality of framework model plugins; and wherein the system dynamically generates the unified software model based on the first plurality of constructs, second plurality of constructs, first plurality of legitimate relationships, and second plurality of legitimate relationships introduced by the SPI and the plurality of framework model plugins; and wherein the unified software model is accessible via the API and is used to link objects specified by the software developer, and to model or develop software applications in accordance with the unified software model.

2. The system of claim 1, wherein the machines or implementations are specified to use the categories of components, and wherein the system then links framework model objects matching the categories of components, as provided by the plurality of framework model plugins.

3. The system of claim 1, wherein the OSGi framework and the JMX framework each have different requirements.

4. The system of claim 3, wherein the plurality of plugins includes at least a third framework model plugin for a third framework having a third modeling or development framework, different than the first modeling or development framework and second modeling or development framework; and
  wherein the third framework model plugin introduces, into the unified software model, a third plurality of constructs and a third plurality of legitimate relationships between the third plurality of constructs, including whether a particular construct requires or produces another construct, as defined by the third modeling or development framework, and wherein the third plurality of constructs introduced by the third framework model plugin can be exposed as categories of component for use with the unified software model.

5. The system of claim 1, wherein the system is used to generate plain old Java objects.

6. The system of claim 1, wherein each different framework model plugin of the plurality of framework model plugins defines a particular dependency injection framework, for use by the software developer in modeling or developing the software applications.

7. A method for providing a software modeling framework, which supports different types of dependency injection and other software modeling or software development frameworks, comprising the steps of:
  providing a service provider interface (SPI) which allows for plugin of a plurality of framework model plugins, including at least a first framework model plugin for an Open Services Gateway initiative (OSGi) framework having a first modeling or development framework and a second framework model plugin for a Java Management Extensions (JMX) framework having a second modeling or development framework different than the first modeling and development framework model,
    wherein the first framework model plugin introduces, into a unified software model, a first plurality of constructs and a first plurality of legitimate relationships between the first plurality of constructs introduced including whether a particular construct requires or produces another construct, as defined by the first modeling or development framework, and wherein the first plurality of constructs introduced by the first framework model plugin can be exposed as categories of component for use with the unified software model, and
    wherein the second framework model plugin introduces, into the unified software model, a second plurality of constructs and a second plurality of legitimate relationships between the second plurality of constructs, including whether a particular construct requires or produces another construct, as defined by the second modeling or development framework, and wherein the second plurality of constructs introduced by the second framework model plugin can be exposed as categories of component for use with the unified software model;
  providing an application provider interface (API) which exposes the categories of component provided by the unified software model and which provides a plurality of functions that allow for machines or implementations to be specified by a software developer, including that objects be linked to the categories of component that are defined by the SPI and the plurality of framework model plugins;
  dynamically generating the unified software model based on the first plurality of constructs, second plurality of constructs, first plurality of legitimate relationships, and second plurality of legitimate relationships introduced by the SPI and the plurality of framework model plugins;
  providing access to the unified software model via the API; and
  using the unified software model to link objects specified by the software developer, and to model or develop software applications in accordance with the unified software model.

8. The method of claim 7, wherein the machines or implementations are specified to use the categories of components, and the method further comprises linking framework model objects matching the categories of components, as provided by the plurality of framework model plugins.

9. The method of claim 7, wherein the OSGi framework and the JMX framework each have different requirements.

10. The method of claim 9, wherein the plurality of plugins includes at least a third framework model plugin for a third framework having a third modeling or development framework, different than the first modeling or development framework and second modeling or development framework; and
  wherein the third framework model plugin introduces, into the unified software model, a third plurality of constructs and a third plurality of legitimate relationships between the third plurality of constructs, including whether a particular construct requires or produces another construct, as defined by the third modeling or development framework, and wherein the third plurality of constructs introduced by the third framework model plugin can be exposed as categories of component for use with the unified software model.

11. The method of claim 7, further comprising using the API to generate plain old Java objects.

12. The method of claim 7, wherein each different framework model plugin of the plurality of framework model plugins defines a particular dependency injection framework, for use by the software developer in modeling or developing the software applications.

13. A non-transitory computer readable medium, including instructions stored thereon which when read and executed by a computer cause the computer to perform the steps comprising:

providing a service provider interface (SPI) which allows for plugin of a plurality of framework model plugins, including at least a first framework model plugin for an Open Services Gateway initiative (OSGi) framework model having a first modeling or development framework and a second framework model plugin for a Java Management Extensions (JMX) framework model having a second modeling or development framework different than the first modeling and development framework model,
  wherein the first framework model plugin introduces, into a unified software model, a first plurality of constructs and a first plurality of legitimate relationships between the first plurality of constructs introduced including whether a particular construct requires or produces another construct, as defined by the first modeling or development framework, and wherein the first plurality of constructs introduced by the first framework model plugin can be exposed as categories of component for use with the unified software model, and
  wherein the second framework model plugin introduces, into the unified software model, a second plurality of constructs and a second plurality of legitimate relationships between the second plurality of constructs, including whether a particular construct requires or produces another construct, as defined by the second modeling or development framework, and wherein the second plurality of constructs introduced by the second framework model plugin can be exposed as categories of component for use with the unified software model;
providing an application provider interface (API) which exposes the categories of component provided by the unified software model and which provides a plurality of functions that allow for machines or implementations to be specified by a software developer, including that objects be linked to the categories of component that are defined by the SPI and the plurality of framework model plugins;
dynamically generating the unified software model based on the first plurality of constructs, second plurality of constructs, first plurality of legitimate relationships, and second plurality of legitimate relationships introduced by the SPI and the plurality of framework model plugins;
providing access to the unified software model via the API; and
using the unified software model to link objects specified by the software developer, and to model or develop software applications in accordance with the unified software model.

14. The non-transitory computer readable medium of claim 13, wherein the machines or implementations are specified to use the categories of components, and wherein the steps further comprise linking framework model objects matching the categories of components, as provided by the framework model plugins.

15. The non-transitory computer readable medium of claim 13, wherein the OSGi framework and the JMX framework have different requirements.

16. The non-transitory computer readable medium of claim 15, wherein the plurality of plugins includes at least a third framework model plugin for a third framework model having a third modeling or development framework different than the first modeling or development framework and second modeling or development framework; and
  wherein the third framework model plugin introduces, into the unified software model, a third plurality of constructs and a third plurality of legitimate relationships between the third plurality of constructs, including whether a particular construct requires or produces another construct, as defined by the third modeling or development framework, and wherein the third plurality of constructs introduces by the third framework model plugin can be exposed as categories of component for use with the unified software model.

17. The non-transitory computer readable medium of claim 16, wherein the steps further comprise using the API to generate plain old Java objects.

18. The non-transitory computer readable medium of claim 13, wherein each different framework model plugin of the plurality of framework model plugins defines a particular dependency injection framework, for use by the software developer in modeling or developing the software applications.

* * * * *

UNITED STATES PATENT AND TRADEMARK OFFICE
CERTIFICATE OF CORRECTION

PATENT NO. : 8,863,074 B2  
APPLICATION NO. : 12/695082  
DATED : October 14, 2014  
INVENTOR(S) : Trent et al.

Page 1 of 2

It is certified that error appears in the above-identified patent and that said Letters Patent is hereby corrected as shown below:

In the drawings,

In figure 6, under Reference Numeral 264, line 1, delete "Applicatio n" and insert -- Application --, therefor.

In figure 6, under Reference Numeral 266, line 1, delete "act ions" and insert -- actions --, therefor.

In the specification,

In column 4, line 49, delete "Ihs-qualifier" and insert -- lhs-qualifier --, therefor.

In column 8, lines 11-12, after "ValueRejectedException" delete "Throws: ValueRejectedException".

In column 8, lines 16-17, after "ValueRejectedException" delete "Throws: ValueRejectedException".

In column 8, lines 23-24, after "ValueRejectedException" delete "Throws: ValueRejectedException".

In columns 9-10, lines 52-53, after "ValueRejectedException" delete "Throws: ValueRejectedException".

In columns 9-10, lines 59-60, after "ValueRejectedException" delete "Throws: ValueRejectedException".

In columns 9-10, lines 66-67, after "ValueRejectedException" delete "Throws: ValueRejectedException".

In column 13, line 35, delete "tring" and insert -- string --, therefor.

Signed and Sealed this
Twenty-eighth Day of April, 2015

Michelle K. Lee
*Director of the United States Patent and Trademark Office*

CERTIFICATE OF CORRECTION (continued)
U.S. Pat. No. 8,863,074 B2

In column 14, line 48, delete "pro vider" and insert -- provider --, therefor.

In column 15, line 5, delete "oncrete" and insert -- concrete --, therefor.

In column 18, line 30, delete "cOnfiguration." and insert -- configuration. --, therefor.

In the claims,

In column 26, line 31, in Claim 16, delete "introduces" and insert -- introduced --, therefor.